(12) United States Patent
Wang et al.

(10) Patent No.: US 11,640,277 B2
(45) Date of Patent: May 2, 2023

(54) METHOD/SYSTEM FOR MANAGING EXPERIMENTAL DATA, COMPUTER READABLE STORAGE MEDIUM, AND DEVICE

(71) Applicant: Shanghai Research Institute of Acupuncture and Meridian, Shanghai (CN)

(72) Inventors: Yu Wang, Shanghai (CN); Chengzhen Jia, Shanghai (CN); Yongqing Yang, Shanghai (CN); Yudong Xu, Shanghai (CN); Leimiao Yin, Shanghai (CN)

(73) Assignee: SHANGHAI RESEARCH INSTITUTE OF ACUPUNCTURE AND MERIDIAN, Shanghai (CN)

( * ) Notice: Subject to any disclaimer, the term of this patent is extended or adjusted under 35 U.S.C. 154(b) by 942 days.

(21) Appl. No.: 16/452,562

(22) Filed: Jun. 26, 2019

(65) Prior Publication Data
US 2020/0409658 A1 Dec. 31, 2020

(51) Int. Cl.
| | |
|---|---|
| *G06F 7/16* | (2006.01) |
| *G06F 16/28* | (2019.01) |
| *G06F 17/16* | (2006.01) |
| *G06F 17/18* | (2006.01) |
| *G06F 7/10* | (2006.01) |

(52) U.S. Cl.
CPC .............. *G06F 7/16* (2013.01); *G06F 7/10* (2013.01); *G06F 16/285* (2019.01); *G06F 17/16* (2013.01); *G06F 17/18* (2013.01)

(58) Field of Classification Search
CPC . G06F 17/16; G06F 17/18; G06F 7/10; G06F 7/16
See application file for complete search history.

(56) References Cited

U.S. PATENT DOCUMENTS

| | | | |
|---|---|---|---|
| 2007/0162411 A1* | 7/2007 | Kupershmidt | ........... G06N 5/02 706/60 |
| 2021/0098131 A1* | 4/2021 | Roder | .................... G16B 40/10 |

* cited by examiner

*Primary Examiner* — Anhtai V Tran
*Assistant Examiner* — Xiaoqin Hu
(74) *Attorney, Agent, or Firm* — Mark M. Friedman (57) ABSTRACT

A method/system for managing experimental data, a computer readable storage medium, and a device are provided. The method includes: recording the managing experimental data, and preprocessing the experimental data, to obtain at least two preprocessed experimental arrays; selecting one element from each of two selected preprocessed experimental arrays according to an analysis requirement, and combining the elements to form a cyclic experimental database, the cyclic experimental database including several combination data; performing cyclic statistical analysis on the combination data in the cyclic experimental database, to obtain a cyclic statistical result corresponding to retrieved combination data.

5 Claims, 5 Drawing Sheets

| Group | Random number | Gender | Age | ACT_0 | ACT_3 | EOS_0 | EOS_3 |
|---|---|---|---|---|---|---|---|
| 1 | 17 | 2 | 16.5 | 18 | 16 | 0.17 | 0.11 |
| 1 | 22 | 1 | 26 | 18 | 24 | 0.09 | 0.45 |
| 1 | 20 | 2 | 29 | 14 | 8 | 0.32 | 0.5 |
| 1 | 9 | 2 | 30.5 | 20 | 24 | 0.29 | 0.2 |
| 1 | 8 | 1 | 32.4 | 11 | 25 | 0.11 | 1.01 |
| 1 | 30 | 1 | 32.6 | 16 | 20 | 0.2 | 0.2 |
| 1 | 21 | 2 | 33.5 | 18 | 20 | 0.06 | 0.05 |
| 1 | 11 | 1 | 33.9 | 18 | 20 | 0.46 | 0.5 |
| 1 | 27 | 1 | 37.8 | 17 | 25 | 0.2 | 2.1 |
| 1 | 6 | 2 | 52.4 | 10 | 17 | 0.13 | 2.79 |
| 1 | 32 | 2 | 54.7 | 10 | 15 | 0.31 | 1.8 |
| 1 | 16 | 1 | 58.8 | 9 | 17 | 0.3 | 2 |
| 1 | 33 | 1 | 60.1 | 13 | 23 | 2.09 | 1.8 |
| 1 | 26 | 2 | 60.1 | 14 | 20 | 0.2 | 1.6 |
| 1 | 5 | 2 | 64.6 | 18 | 18 | 0.16 | 1.79 |
| 1 | 34 | 1 | 65 | 20 | 21 | 0.32 | 0.4 |
| 1 | 28 | 1 | 65.4 | 24 | 25 | 0.1 | 2.5 |
| 1 | 13 | 2 | 65.8 | 17 | 19 | 0.6 | 1.6 |
| 1 | 19 | 1 | 66.6 | 10 | 20 | 0.35 | 2.37 |
| 1 | 39 | 1 | 76.6 | 23 | 25 | 1 | 2.1 |
| 2 | 37 | 2 | 14.1 | 13 | 11 | 0.45 | 2.56 |
| 2 | 1 | 1 | 21.9 | 21 | 19 | 0.42 | 2.1 |
| 2 | 4 | 2 | 23.1 | 20 | 23 | 0.58 | 0.42 |
| 2 | 18 | 1 | 27.8 | 12 | 12 | 0.4 | 1.3 |
| 2 | 3 | 1 | 28.9 | 17 | 15 | 0.21 | 2.11 |
| 2 | 25 | 2 | 29 | 19 | 21 | 0.8 | 2.5 |
| 2 | 2 | 2 | 29.6 | 14 | 24 | 0.9 | 1.9 |
| 2 | 12 | 2 | 30.7 | 23 | 24 | 0.14 | 2.17 |
| 2 | 35 | 1 | 31.1 | 21 | 21 | 0.37 | 1.7 |
| 2 | 24 | 2 | 31.3 | 17 | 17 | 0.18 | 1.48 |
| 2 | 15 | 1 | 33.8 | 19 | 21 | 0.23 | 1.47 |
| 2 | 7 | 2 | 39 | 9 | 8 | 0.7 | 1.87 |
| 2 | 31 | 1 | 39.2 | 19 | 28 | 0.13 | 1.6 |
| 2 | 10 | 1 | 41.8 | 17 | 16 | 0.36 | 1.61 |
| 2 | 29 | 2 | 46.2 | 10 | 12 | 0.03 | 1.17 |
| 2 | 23 | 2 | 50.6 | 21 | 23 | 0.24 | 1.81 |
| 2 | 36 | 2 | 54 | 9 | 17 | 0.2 | 1.8 |
| 2 | 40 | 2 | 56.3 | 11 | 12 | 0.16 | 1.03 |
| 2 | 38 | 1 | 60.8 | 16 | 16 | 0.25 | 1.33 |
| 2 | 14 | 2 | 61.8 | 25 | 12 | 0.34 | 2.68 |

METHOD/SYSTEM FOR MANAGING EXPERIMENTAL DATA, COMPUTER READABLE STORAGE MEDIUM, AND DEVICE

BACKGROUND OF THE PRESENT DISCLOSURE

Field of Disclosure

The present disclosure relates to technical field of medical data processing, in particular, to a management method and system, and more specifically to a method/system for managing experimental data, a computer readable storage medium, and a device.

Description of Related Arts

Clinical data has wide variety, and there is no uniform classification standard. In the present disclosure, the clinical data is classified into four classes of data: baseline indicators (B), evaluation indicators (E), intervention methods/groups (G), and time (T), according to different properties and functions thereof. This method is referred to as a BEGT4 classification method for short.

Clinical analysis relates to system analysis among the four classes of data described above. Particularly, subgroup analysis (stratified analysis) is one of common methods in clinical research. Science researchers usually need to study a curative effect difference between different subgroups (strata) in the same group at a specific time node, or study a curative effect difference of the same subgroup (stratum) between different groups at a specific time node. This requires permutation and combination analysis on three classes of data, that is, baseline indicators, time, and evaluation indicators, based on group data. However, for clinical data, there are usually thousands of or even more permutation and combination results. Currently, statistical analysis is generally performed by using finite permutations and combinations based on a personal subjective judgment. In existing statistical software such as Statistical Product and Service Solutions (SPSS) and Statistical Analysis System (SAS), general operation steps include: inputting grouped data→selecting a statistical method→selecting a group or a stratum→selecting evaluation indicators of a specific time point→performing analysis and outputting a result. The foregoing conventional operation procedure is finite analysis performed for one permutation and combination of clinical data. If more or complete permutations and combinations need to be analyzed, the foregoing operations need to be repeated constantly. Such a statistical analysis process and use of software are time-consuming and labor-consuming in practical clinical data analysis research, the operation is inconvenient. Moreover, it is impossible to analyze data globally, and judgments on results are highly subjective.

SUMMARY OF THE PRESENT DISCLOSURE

The present disclosure provides a method/system for managing experimental data, a computer readable storage medium, and a device.

The present disclosure provides a method for managing experimental data, comprising: recording the experimental data, and preprocessing the experimental data, to obtain at least two preprocessed experimental arrays; selecting one element from each of two selected preprocessed experimental arrays according to an analysis requirement, and combining the elements to establish a cyclic experimental database, the cyclic experimental database comprises a plurality of combination data meeting the analysis requirement; and performing cyclic statistical analysis on the combination data in the cyclic experimental database, to obtain a cyclic statistical result corresponding to retrieved combination data.

In an embodiment of the present disclosure, recording the experimental data and preprocessing the experimental data comprises: classifying the recorded experimental data according to attribute classes of the experimental data, the attribute classes comprises baseline indicators, evaluation indicators, intervention methods/groups, and time; stratifying the classified experimental data respectively; and grouping stratified experimental data of other classes based on one of the attribute classes, to obtain at least two preprocessed experimental arrays.

In an embodiment of the present disclosure, classifying the recorded experimental data according to attribute classes of the experimental data comprises classifying the recorded experimental data into baseline indicator data, evaluation indicator data, intervention method/data, and time data; and stratifying the classified experimental data respectively comprises stratifying the baseline indicator data, the evaluation indicator data, the intervention method/group data, and the time data according to predetermined stratifying standards of the baseline indicator data, the evaluation indicator data, the intervention method/group data, and the time data respectively, to form baseline indicator stratified data, evaluation indicator stratified data, intervention method/group stratified data, and time data.

In an embodiment of the present disclosure, selecting one element from each of two selected preprocessed experimental arrays according to an analysis requirement, and combining the elements to establish a cyclic experimental database comprises: selecting one element from each of the two selected preprocessed experimental arrays, and performing complete permutation and combination sequentially to form a complete permutation and combination database, where the selected elements are comparable to each other, and combination data in the complete permutation and combination database comprises group, baseline, stratum, time, and endpoint information; and retrieving, from the complete permutation and combination database, combination data meeting the analysis requirement, to establish the cyclic experimental database, the cyclic experimental database is a subset of the complete permutation and combination database.

In an embodiment of the present disclosure, the method further comprises outputting the cyclic statistical result in a specified manner.

In an embodiment of the present disclosure, outputting the cyclic statistical result in a specified manner comprises: outputting, in a form of a two-dimensional numerical matrix, the cyclic statistical result obtained after the cyclic statistical analysis; discretizing matrix elements in the two-dimensional numerical matrix, and dividing the matrix elements according to pre-divided statistical ranges; and assigning different colors or different grayscale values to the divided statistical ranges, so that the cyclic statistical result is output visually.

According to another aspect of the present disclosure, a system for managing experimental data is further provided, comprising: a recording module, configured to record the experimental data, and preprocess the experimental data, to obtain at least two preprocessed experimental arrays; and a processing module, configured to select one element from each of two selected preprocessed experimental arrays according to an analysis requirement, and combine the elements to establish a cyclic experimental database, the cyclic experimental database comprises a plurality of combination data; and perform cyclic statistical analysis on the combination data in the cyclic experimental database, to obtain a cyclic statistical result corresponding to retrieved combination data.

In an embodiment of the present disclosure, the system for managing experimental data further comprises an output module, configured to output the cyclic statistical result in a specified manner.

According to another aspect of the present disclosure, a computer readable storage medium is provided, a computer program is stored thereon, and when the program is executed by a processor, a method for managing experimental data is implemented, the method comprises: recording the experimental data, and preprocessing the experimental data, to obtain at least two preprocessed experimental arrays; selecting one element from each of two selected preprocessed experimental arrays according to an analysis requirement, and combining the elements to establish a cyclic experimental database, wherein the cyclic experimental database comprises a plurality of combination data meeting the analysis requirement; and performing cyclic statistical analysis on the combination data in the cyclic experimental database, to obtain a cyclic statistical result corresponding to retrieved combination data.

According to an aspect of the present disclosure, a device is provided, comprising: a processor and a memory, where the memory is configured to store a computer program, and the processor is configured to execute the computer program stored in the memory, so that the device performs a method for managing experimental data. The method comprises: recording the experimental data, and preprocessing the experimental data, to obtain at least two preprocessed experimental arrays; selecting one element from each of two selected preprocessed experimental arrays according to an analysis requirement, and combining the elements to establish a cyclic experimental database, wherein the cyclic experimental database comprises a plurality of combination data meeting the analysis requirement; and performing cyclic statistical analysis on the combination data in the cyclic experimental database, to obtain a cyclic statistical result corresponding to retrieved combination data.

LIST OF REFERENCE NUMERALS

7 System for managing experimental data
71 Recording module
72 Processing module
73 Output module
S11 to S14 Steps
S111 to S113 Steps

DETAILED DESCRIPTION OF THE PREFERRED EMBODIMENTS

Implementations of the present disclosure are illustrated below through specific embodiments. A person skilled in the art can easily understand other advantages and efficacy of the present disclosure according to the content disclosed in this specification. The present disclosure can also be implemented or applied through other different specific implementations. Various modifications or variations can also be made on details in this specification based on different opinions and applications without departing from the spirit of the present disclosure. It should be noted that, the embodiments in the present disclosure and features in the embodiments can be combined with each other if no conflict occurs.

It should be noted that, the figures provided in the following embodiments merely illustrate the basic conception of the present disclosure schematically. Therefore, the figures only show components related to the present disclosure, and are not drawn according to the quantity, shapes and sizes of components during actual implementation. The pattern, quantity and ratio of components during actual implementation can be changed arbitrarily, and the component layout may also be more complex.

It is urgent to resolve the defects that standard classification and global analysis for clinical data cannot be implemented in batches and judgments on results are highly subjective.

Technical thinking of the present disclosure is as follows:

(1) Classifying and Entering of Clinical Experimental Data:

Classifying clinical experimental data into four classes, which are baseline indicators (B), evaluation indicators (E), intervention methods/groups (G), and time (T), and numbering the classified data;

Entering indicator information, determining stratify standards, and specifying numbers of data in each stratum.

(2) Grouping the Stratified Data by a Computer:

Based on the intervention methods/groups (G), the evaluation indicators (E) and the baseline indicators (B) are split into arrays EG (EG-form codes) and arrays BG (BG-form codes), which are numbered respectively.

Based on the time (T), the evaluation indicators (E) data is split into arrays ET (ET-form codes), which are numbered respectively.

Based on the time (T), the array EG is split into arrays EGT (EGT-form codes), which are numbered respectively.

(3) The foregoing arrays provide a data basis for implementing complete permutation and combination matching and cyclic operations for data. The complete permutations and combinations between arrays include the following steps:

Dividing data unit sets. Combined indicators of group or stratum with baseline (BG) are considered as a set BG. Combined indicators of time and endpoint (EGT) are considered as a set EGT. Elements in the set BG include group, baseline, and stratum information, and elements in the set EGT include information about time and evaluation indicators. This step is intended to split the four classes of experimental data into data units, so as to provide a data basis for implementing complete permutations and combinations.

Implementation of complete permutations and combinations: a random element is selected from the set BG, and a random element is selected from the set EGT. The two data units are combined. This combination may include group, baseline, stratum, time, and endpoint information. A cyclic database of complete permutations and combinations is formed.

(4) Cyclic statistical analysis: all or some of data unit combinations are retrieved from the cyclic database according to an analysis objective by means of cyclic pairing, and specific statistical analysis is performed.

(5) Outputting and visualization of a statistical result: a statistical result (value P) of the foregoing cyclic operation is output as a two-dimensional numerical matrix. Values in the matrix are discretized, and are divided into three ranges according to the magnitude of the value P. Different colors or grayscale values are assigned to the ranges, so that a global statistical result is visualized.

Embodiment 1

This embodiment provides a method for managing experimental data, including:

recording the experimental data, and preprocessing the experimental data, to obtain at least two preprocessed experimental arrays;

selecting one element from each of two selected preprocessed experimental arrays according to an analysis requirement, and combining the elements selected to establish a cyclic experimental database, the cyclic experimental database includes a plurality of combination data; and retrieving combination data from the cyclic experimental database by cyclic pairing, and performing cyclic statistical analysis on the retrieved combination data, to obtain a cyclic statistical result corresponding to retrieved combination data.

Figure 1:
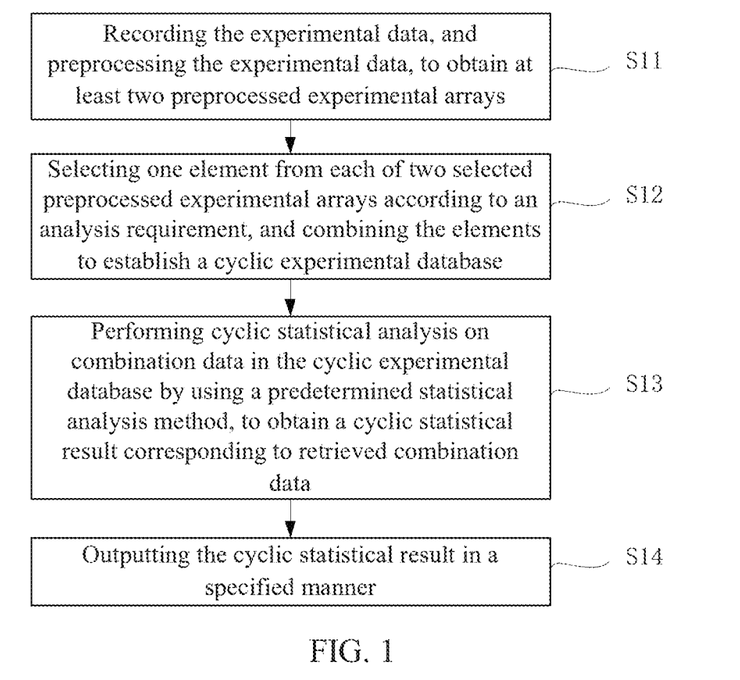
FIG. 1 is a schematic flowchart of an embodiment of a method for managing experimental data according to the present disclosure.
Figure 2:
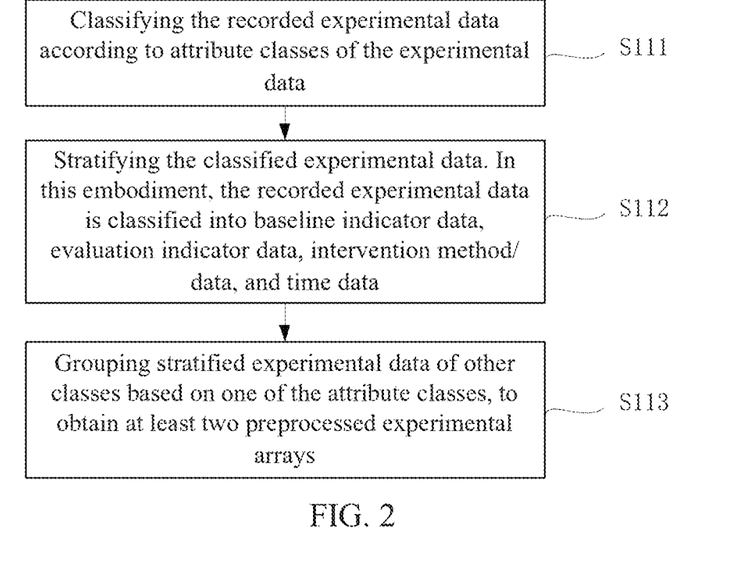
FIG. 2 is a specific schematic flowchart of S11 in a method for managing experimental data according to the present disclosure.

The method for managing experimental data provided in this embodiment is described in detail below with reference to the drawings. The experimental data in this embodiment is clinical experimental data. Referring to FIG. 1, which is a schematic flowchart of the method for managing experimental data in an embodiment. As shown in FIG. 1, the method for specifically includes the following steps:

S11: Recording the experimental data, and preprocessing the experimental data, to obtain at least two preprocessed experimental arrays. Referring to FIG. 2, which is a specific schematic flowchart of S11. As shown in FIG. 2, S11 includes the following steps:

S111: Classifying the recorded experimental data according to attribute classes of the experimental data. The attribute classes include baseline indicators (B), evaluation indicators (E), intervention methods/groups (G), and time (T). In this embodiment, the classified baseline indicators (B), evaluation indicators (E), intervention methods/groups (G), and time (T) are numbered. For example, the numbers are B1, B2 . . . ; E1, E2 . . . ; G1, G2 . . . ; T1, T2 . . . .

S112: Stratifying the classified experimental data. In this embodiment, the recorded experimental data is classified into baseline indicator data, evaluation indicator data, intervention method/data, and time data. The classified experimental data is stratified according to predetermined stratifying standards, and numbers of data in each stratum are specified.

Specifically, according to predetermined stratifying standards, the baseline indicator data, the evaluation indicator data, the intervention method/group data, and the time data are stratified respectively, to form baseline indicator stratified data, evaluation indicator stratified data, intervention method/group stratified data, and time data. Referring to Table 1, a table of experimental data classification and indicator stratum numbers is shown.

TABLE 1

Table of Experimental Data Classification and Indicator Stratum Numbers

| Attribute class | Indicator information | First-stratum information | Second-stratum information | ... | $N^{th}$-stratum information |
|---|---|---|---|---|---|
| B | B1 | B11 | B111 | ... | ... |
|   |    | B12 | B121 | ... | ... |
|   |    | ... | ... | ... | ... |
|   | B2 | B21 | B211 | ... | ... |
|   |    | B22 | B221 | ... | ... |
|   |    | ... |     | ... | ... |
|   | ... | ... | ... | ... | ... |
| E | E1 | E11 | E111 | ... | ... |
|   |    | E12 | E121 | ... | ... |
|   |    | ... | ... | ... | ... |
|   | E2 | E21 | E211 | ... | ... |
|   |    | E22 | E221 | ... | ... |
|   |    | ... | ... | ... | ... |
|   | ... | ... | ... | ... | ... |
| G | G1 | G11 | G111 | ... | ... |
|   |    | G12 | G121 | ... | ... |
|   |    | ... | ... | ... | ... |
|   | G2 | G21 | G211 | ... | ... |
|   |    | G22 | G221 | ... | ... |
|   |    | ... | ... | ... | ... |
|   | ... | ... | ... | ... | ... |
| T | T1 | T11 | T111 | ... | ... |
|   |    | T12 | T121 | ... | ... |
|   |    | ... | ... | ... | ... |
|   | T2 | T21 | T211 | ... | ... |
|   |    | T22 | T221 | ... | ... |
|   |    | ... | ... | ... | ... |
|   | ... | ... | ... | ... | ... |

S113: Grouping stratified experimental data of other classes based on one of the attribute classes, to obtain at least two preprocessed experimental arrays.

For example, based on the intervention methods/groups (G), the evaluation indicators (E) and the baseline indicators (B) are split into preprocessed experimental arrays respectively, which are arrays of EG-form codes and arrays of BG-form codes. The arrays are numbered E11G1, E11G2 . . . ; and B11G1, B11G2 . . . , respectively. Referring to Table 2, an experimental array table of experimental arrays of EG-form codes and experimental arrays of BG-form codes that are obtained by splitting the evaluation indicators (E) and the baseline indicators (B) based on the intervention methods/groups (G) is shown.

| Attribute class | Indicator information | First-stratum information | G | | ... |
|---|---|---|---|---|---|
| | | | G1 | G2 | |
| B | B1 | B11 | B11 G1 | B11 G2 | ... |
| | | B12 | B12 G1 | B12 G2 | ... |
| | | ... | ... | ... | ... |
| | B2 | B21 | B21 G1 | B21 G2 | ... |
| | | B22 | B22 G1 | B22G2 | ... |
| | | ... | ... | ... | ... |
| ... | ... | ... | ... | ... | ... |
| E | E1 | E11 | E11 G1 | E11 G2 | ... |
| | | E12 | E12 G1 | E12G2 | ... |
| | | ... | ... | ... | ... |
| | E2 | E21 | E21 G1 | E21 G2 | ... |
| | | E22 | E22 G1 | E22G2 | ... |
| | | ... | ... | ... | ... |
| ... | ... | ... | ... | ... | ... |

For example, based on the time (T), the evaluation indicators (E) data is slit into experimental arrays of ET-form codes, which are numbered E11T1, E11T2 . . . , respectively. Referring to Table 3, a table of experimental arrays of ET-form codes is shown.

TABLE 3

Table of Experimental Arrays of ET-Form Codes

| Attribute class | Indicator information | First-stratum information | T | | ... |
|---|---|---|---|---|---|
| | | | T1 | T2 | |
| B | B1 | B11 | | | |
| | | B12 | | | |
| | | ... | | | |
| | B2 | B21 | | | |
| | | B22 | | | |
| | | ... | | | |
| ... | ... | ... | | | |

TABLE 3-continued

Table of Experimental Arrays of ET-Form Codes

| Attribute class | Indicator information | First-stratum information | T | | ... |
|---|---|---|---|---|---|
| | | | T1 | T2 | |
| E | E1 | E11 | E11 T1 | E11 T2 | ... |
| | | E12 | E12 T1 | E12 T2 | ... |
| | | ... | ... | ... | ... |
| | E2 | E21 | E21 T1 | E21 T2 | ... |
| | | E22 | E22 T1 | E22 T2 | ... |
| | | ... | ... | ... | ... |
| ... | ... | ... | ... | ... | ... |

For example, based on the time (T), an array EG is split into arrays of EGT-form codes, which are numbered E11G1T1, E11G1T2 . . . , respectively. Referring to Table 4, a table of experimental arrays of EGT-form codes is shown.

TABLE 4

Table of Experimental Arrays of BG-Form Codes and Experimental Arrays of EGT-Form Codes

| Attribute class | Indicator information | Stratum information | G | | | Data set |
|---|---|---|---|---|---|---|
| | | | G1 | G2 | ... | |
| B | B1 | B11 | B11 G1 | B11 G2 | ... | Experimental |
| | | B12 | B12 G1 | B12G2 | ... | arrays of |
| | | ... | ... | ... | ... | BG-form |
| | B2 | B21 | B21 G1 | B21G2 | ... | codes |
| | | B22 | B22 G1 | B22G2 | ... | |
| | | ... | ... | ... | ... | |
| ... | ... | ... | ... | ... | ... | |

| | | | T | | T | | ... |
|---|---|---|---|---|---|---|---|
| Attribute class | Indicator information | Stratum information | T1 G1T1 | T2 G1T2 | ... T1 G2T1 | T2 G2T2 | ... ... |
| E | E1 | E11 | E11 G1T1 | E11 G1T2 | ... E11 G2T1 | E11 G2T2 | ... ... Arrays of EGT-form codes |
| | | E12 | E12 G1T1 | E12 G1T2 | ... E12 G2T1 | E12 G2T2 | ... ... |
| | | ... | ... | ... | ... ... | ... | ... ... |
| | E2 | E21 | E21 G1T1 | E21 G1T2 | ... E21 G2T1 | E21 G2T2 | ... ... |
| | | E22 | E22 G1T1 | E22 G1T2 | ... E22 G2T1 | E22 G2T2 | ... ... |
| | | ... | ... | ... | ... ... | ... | ... ... |

Figure 3:
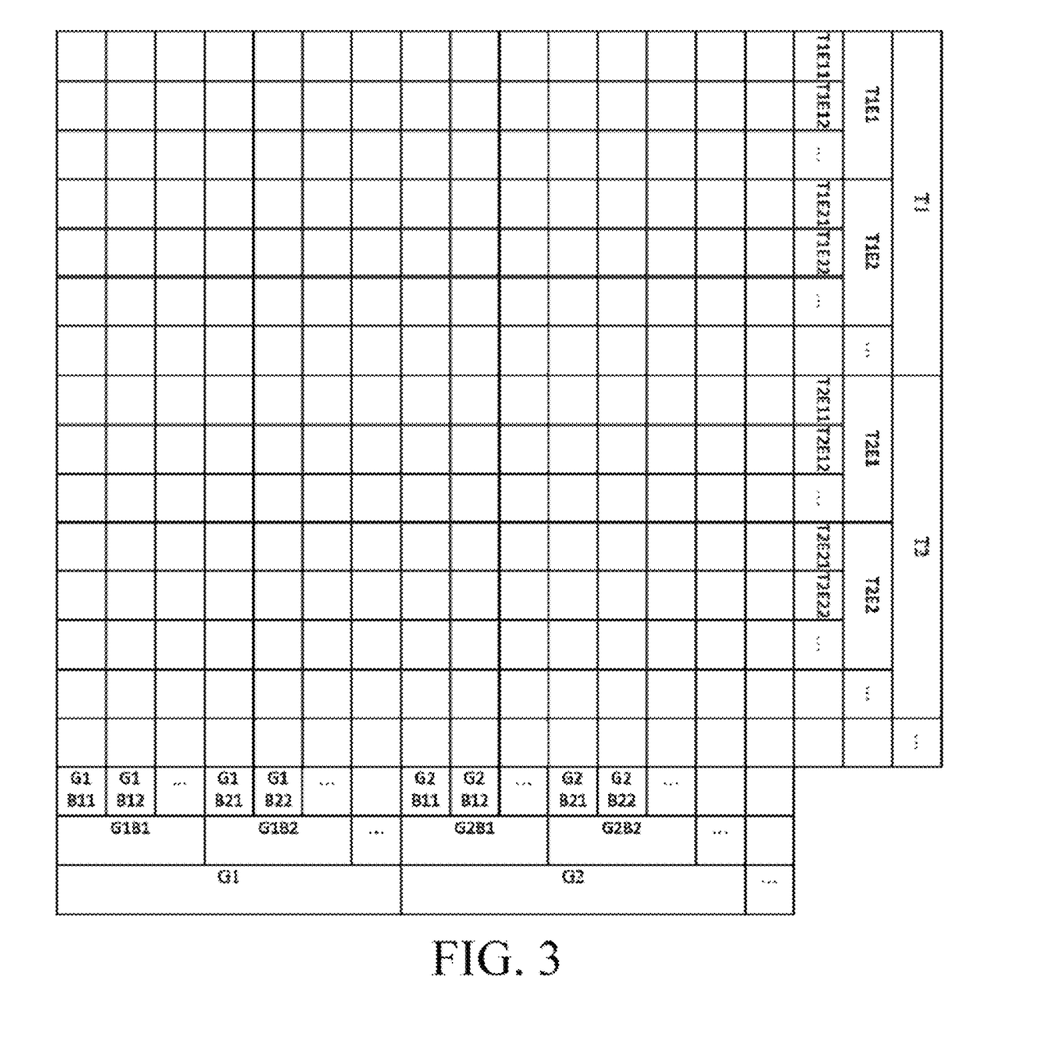
FIG. 3 is a schematic plan view of an implementation of a cyclic experimental database according to the present disclosure.

S12: Selecting one element from each of two selected preprocessed experimental arrays according to an analysis requirement, and combining the elements to establish a cyclic experimental database. The cyclic experimental database includes a plurality of combination data meeting the analysis requirement. The selected elements are homogeneous, that is, the selected elements are comparable to each other. Combination data in the cyclic experimental database includes group, baseline, stratum, time, and endpoint information. Referring to FIG. 3, a schematic plan view of an implementation of a cyclic experimental database is shown.

S12 specifically includes the following steps:

selecting one element from each of the two selected preprocessed experimental arrays, and performing complete permutation and combination sequentially to form a complete permutation and combination database. The selected elements are comparable to each other. The combination data in the complete permutation and combination database includes group, baseline, stratum, time, and endpoint information.

retrieving, from the complete permutation and combination database, combination data meeting the analysis requirement, to establish the cyclic experimental database. The cyclic experimental database is a subset of the complete permutation and combination database.

For example, the analysis requirement is to obtain, through comparison at a specific time node Tn, a difference between corresponding experimental arrays of evaluation indicators Em meeting a stratification condition of a specific baseline Bj, in groups G1 and G2.

For example, two data elements G1BjEmTn and G2BjEmTn are selected. Other information except the group (G) of the two data elements is the same.

Specifically, an experimental array (BG) of combined indicators of group or stratum with baseline is considered as a BG-set experimental array, and combined indicators (EGT) of time and endpoint are considered as an EGT-set experimental array. Elements in the BG-set experimental array include group, baseline, and stratum information. Elements in the EGT-set experimental array include information about time and evaluation indicators. In this embodiment, the four classes of experimental data are split into data units, so as to provide a data basis for implementing complete permutations and combinations.

S13: Performing cyclic statistical analysis on combination data in the cyclic experimental database by using a predetermined statistical analysis method, to obtain a cyclic statistical result corresponding to retrieved combination data.

For example, a random element is selected from the BG-set experimental array cyclically, and a random element is selected from the EGT-set experimental array cyclically. For example, two data elements G1BjEmTn and G2BjEmTn, are selected. Other information except the group (G) is the same. The intervention method/group (G1) and the intervention method/group (G2) each corresponds to a permutation and combination data set comprising BjEmTn, and permutation and combination points are selected from the data set cyclically for component comparison.

In this embodiment, any predetermined statistical analysis method having a statistical analysis function is incorporated in the protection scope of the present disclosure. For example, according to the statistical analysis method in this embodiment, a random element is selected from each of the BG-set experimental array and the EGT-set experimental array by using a t inspection method, and statistical comparative analysis is performed, to obtain a cyclic statistical result P corresponding to the retrieved combination data.

S14: Outputting the cyclic statistical result in a specified manner.

Figure 4:
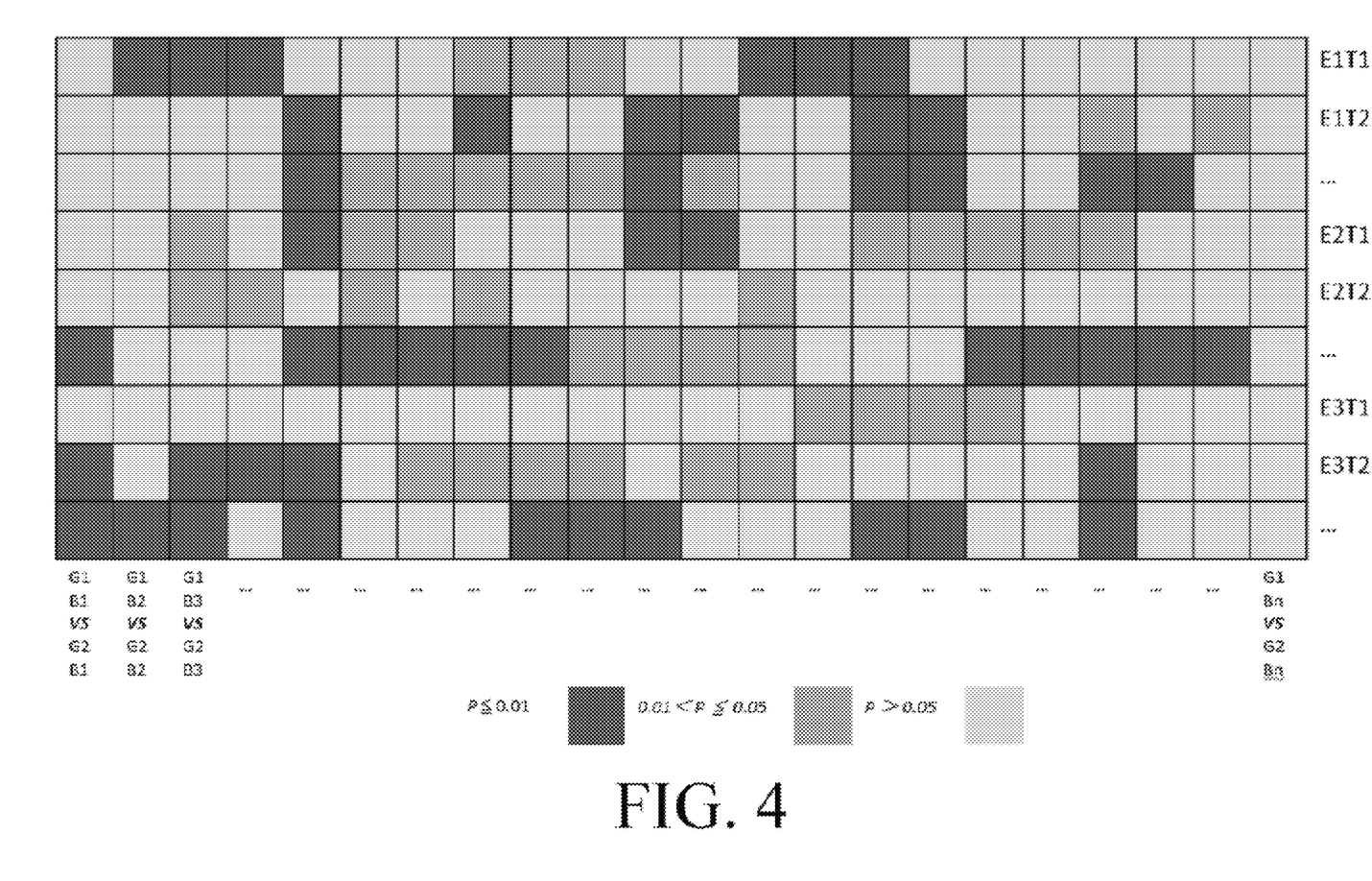
FIG. 4 is a schematic diagram of a visualized output of a cyclic statistical result according to the present disclosure.

Specifically, the cyclic statistical result obtained after the cyclic statistical analysis is output in a form of a two-dimensional numerical matrix. Matrix elements in the two-dimensional numerical matrix are discretized, and the matrix elements are divided according to pre-divided statistical ranges. Different colors or different grayscale values are assigned to the divided statistical ranges, so that the cyclic statistical result is output visually. Referring to FIG. 4, a schematic diagram of a visualized output of the cyclic statistical result is shown. As shown in FIG. 4, the pre-divided statistical ranges are (0, 0.01], (0.01, 0.05], and (0.05, 1], which are represented by using different grayscale values respectively. The darkest color represents the statistical range (0, 0.01], the second darkest color represents the statistical range (0.01, 0.05], and the shallowest color represents the statistical range (0.05, 1].

Figure 5:
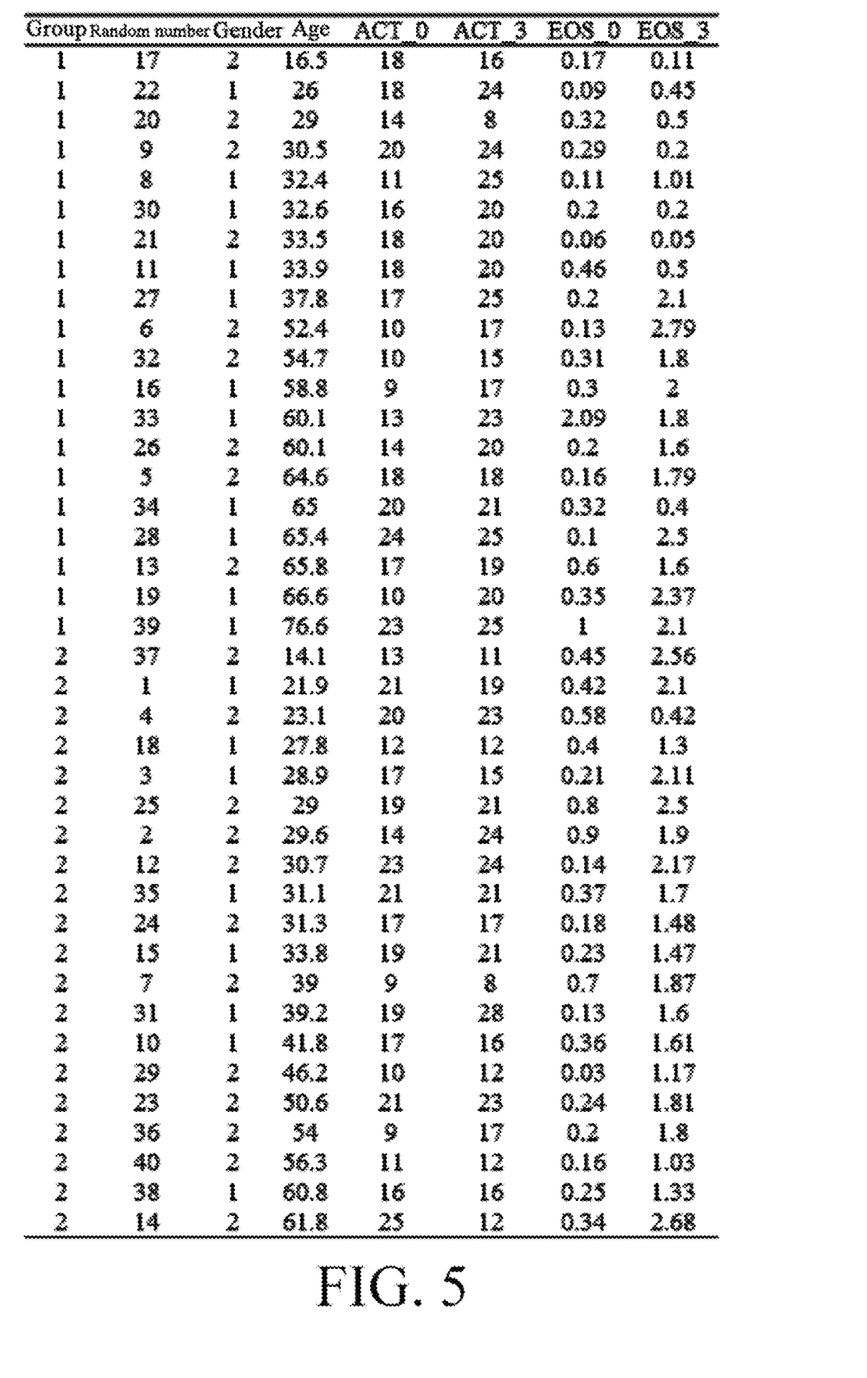
FIG. 5 is a schematic diagram of an embodiment of a data table of experimental data according to the present disclosure.

Intervention methods/groups of a drug I and a drug II are used now to treat asthma patients respectively. Baseline indicators of the patients include gender and age. In the whole treatment process, evaluation indicators of the patients: an asthma control experimental score (ACT) and eosinophils (EOS), are measured at the time node of Week 3 and Week 6 respectively. An analysis requirement is to compare curative effect indicator scores of young male patients between groups at each time node, and compare asthma curative effects of the two drugs. Referring to FIG. 5, a schematic diagram of an embodiment of a data table of experimental data is shown. As shown in FIG. 5, baseline indicators B of patients comprise gender and age. Time nodes are Week 3 and Week 6.

A specific implementation procedure of the method for managing experimental data according to this embodiment is as follows:

A cyclic experimental database is formed according to exemplary data and classification. Referring to Table 5, a classification table of exemplary experimental data is shown.

TABLE 5

Classification Table of Exemplary Experimental Data

| Attribute class | Class number | Clinical data | Stratum number | Clinical data |
|---|---|---|---|---|
| Intervention methods/groups (G) | G1 | Drug I | | |
| | G2 | Drug II | | |
| Baseline indicators (B) | B1 | Gender | B11 | Male |
| | | | B12 | Female |
| | B2 | Age | B21 | Young (≤34) |
| | | | B22 | Not young (>34) |
| Evaluation indicators (E) | E1 | Asthma control experimental score (ACT) | E11 | ≤22 |
| | | | E12 | >22 |
| | E2 | Eosinophil system (EOS) | E21 | >0.5 × 109/L |
| | | | E22 | ≤0.5 × 109/L |
| Time (T) | T1 | | | |
| | T2 | | | |

Referring to Table 6, a complete permutation and combination database formed based on the exemplary data is shown.

TABLE 6

Complete Permutation and Combination Database Formed Based on Exemplary Data

|  |  |  |  |  |  |  |  |  |  |
|---|---|---|---|---|---|---|---|---|---|
|  |  |  |  |  |  |  |  | T1E11 | T1E1 |
|  |  |  |  |  |  |  |  | T1E12 |  |
|  |  |  |  |  |  |  |  | T1E21 | T1E2 |
|  |  |  |  |  |  |  |  | T1E22 |  |
|  |  |  |  |  |  |  |  | T2E11 | T2E1 |
|  |  |  |  |  |  |  |  | T2E12 |  |
|  |  |  |  |  |  |  |  | T2E21 | T2E2 |
|  |  |  |  |  |  |  |  | T2E22 |  |
| G1B11 | G1B12 | G1B21 | G1B22 | G2B11 | G2B12 | G2B21 | G2B22 |  |  |
| G1B1 |  | G1B2 |  | G2B1 |  | G2B2 |  |  |  |

An exemplary requirement is to conduct, at each time node, inter-group comparative statistical collection on each evaluation indicator of partial data meeting conditions (male, young). Therefore, acyclic analysis database formed by data selected from the complete permutation and combination database is as follows. The cyclic experimental database is a subset of the complete permutation and combination database. Referring to Table 7, a data table of the cyclic experimental database is shown.

TABLE 7

Cyclic Experimental Database

| Number | Cyclic statistical analysis | Cyclic statistical result |
|---|---|---|
| 1 | (G1B11E1T1, G2B11E1T1) | 0.472 |
| 2 | (G1B11E1T2, G2B11E1T2) | 0.049 |
| 3 | (G1B11E2T1, G2B11E2T1) | 0.416 |
| 4 | (G1B11E2T2, G2B11E2T2) | 0.405 |
| 5 | (G1B21E1T1, G2B21E1T1) | 0.448 |
| 6 | (G1B21E1T2, G2B21E1T2) | 0.762 |
| 7 | (G1B21E2T1, G2B21E2T1) | 0.043 |
| 8 | (G1B21E2T2, G2B21E2T2) | 0.000 |

Data numbered 1 to 8 in the cyclic experimental database is transmitted to a third-party statistical analysis program or software. Statistical analysis is performed by means of independent sample t test, and a cyclic statistical result is obtained, for example, the cyclic statistical result P shown in Table 7.

Figure 6:
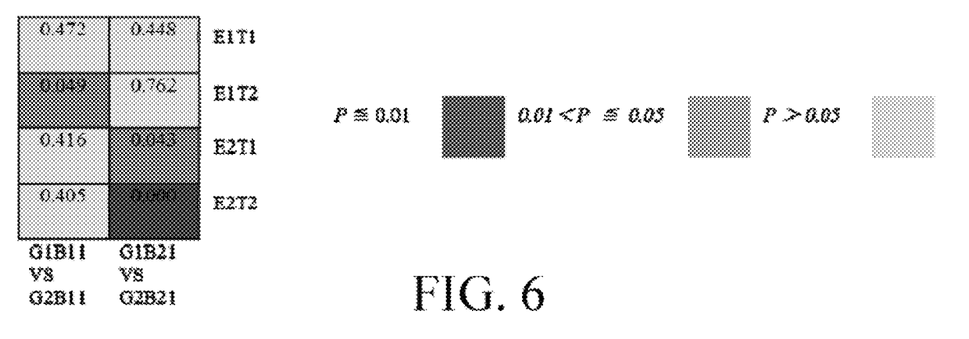
FIG. 6 is a schematic structural diagram of visualized cyclic statistics of exemplary data according to the present disclosure.

Outputting and visualization of the cyclic statistical result P includes the cyclic statistical result (value P) of the cyclic operation in Table 7 is discretized, and is divided into three ranges according to the magnitude of the value P: (0, 0.01], (0.01, 0.05], (0.05, 1]. Different colors or grayscale values are assigned to the ranges, so that a global statistical result is visualized. Referring to FIG. 6, a schematic structural diagram of visualized cyclic statistics of exemplary data is shown.

This embodiment further provides a computer readable storage medium, which stores a computer program. When the program is executed by a processor, the foregoing method for managing experimental data is implemented. A person of ordinary skill in the art may understand that all or some of the steps of the foregoing method embodiments may be implemented by a computer program instructing relevant hardware. The computer program may be stored in a computer readable storage medium. When the program runs, the steps of the foregoing method embodiments are performed. The foregoing storage medium comprises: various media that can store program code, such as a ROM, a RAM, a magnetic disk, or an optical disc.

The method for managing experimental data provided in this embodiment facilitates organization and management of clinical experimental data, and a statistical analysis strategy based on a complete permutation and combination mode for data units can change a single-combination analysis method for clinical experimental data, thereby implementing global analysis for medical data. A statistical program design corresponding to the complete permutation and combination analysis strategy can change a pair-wise data unit operation mode of existing interactive statistical software, and implement identical statistical analysis steps in batches. A result is output visually. Global analysis can be performed. This embodiment is more convenient to use, and avoids the one-sidedness and blindness of conventional statistical strategies and methods.

Embodiment 2

This embodiment provides a system for managing experimental data, comprising:

a recording module, configured to record the experimental data, and preprocess the experimental data, to obtain at least two preprocessed experimental arrays; and a processing module, configured to select one element from each of two selected preprocessed experimental arrays according to an analysis requirement, and combine the elements to establish a cyclic experimental database. The cyclic experimental database includes a plurality of combination data. Cyclic statistical analysis is performed on the combination data in the cyclic experimental database, to obtain a cyclic statistical result corresponding to retrieved combination data.

The management system for experimental data provided in this embodiment is described in detail below with reference to the drawings. It should be noted that, the division of the modules of the management system below is merely a division based on logical functions, and during actual implementation, all or some of the modules may be integrated into one physical entity, or may be physically separate. The modules may be all implemented by processing elements invoking software, or all implemented by hardware. Alternatively, it is also possible that some modules are implemented by processing elements invoking software, and some modules are implemented by hardware. For example, a module x may be an independent processing element, or may be integrated in a chip of the foregoing apparatus. In addition, the module x may also be stored in a memory of the foregoing apparatus in a form of program code, and a processing element in the foregoing apparatus invokes and executes the function of the module x. Implementation of other modules is similar to that of the module x. Moreover, all or some of the modules may be integrated, or the modules may be implemented independently. The processing element herein may be an integrated circuit having a signal processing capability. In an implementation process, the steps of the foregoing method or the foregoing modules may be implemented by hardware integrated logic circuits or software-form instructions in the processing elements.

For example, the foregoing modules may be configured as one or more integrated circuits for implementing the foregoing method, such as one or more application specific integrated circuits (ASICs), one or more digital signal processors (DSPs), one or more field programmable gate arrays (FPGAs), or the like. For another example, when one of the foregoing modules is implemented by a processing element invoking program code, the processing element may be a general-purpose processor, such as a central processing unit (CPU) or other processors that can invoke program code. For another example, the modules may be integrated together, and implemented in a form of a system-on-a-chip (SOC).

Figure 7:
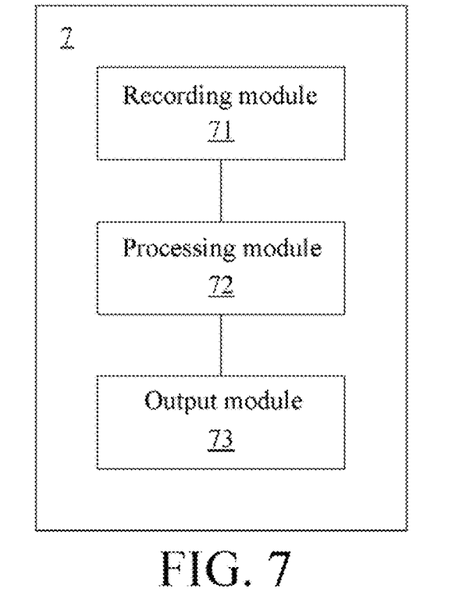
FIG. 7 is a schematic structural diagram of a principle of a system for managing experimental data according to the present disclosure in an embodiment.

Referring to FIG. 7, which is a schematic structural diagram of a principle of a management system for experimental data according to an embodiment. As shown in FIG. 7, the system 7 for managing experimental data includes a recording module 71, a processing module 72, and an output module 73.

The recording module 71 is configured to record the experimental data, and preprocess the experimental data, to obtain at least two preprocessed experimental arrays.

The recording module 71 is configured to classify the recorded experimental data according to attribute classes of the experimental data; stratify the classified experimental data respectively; and group stratified experimental data of other classes based on one of the attribute classes, to obtain at least two preprocessed experimental arrays. In this embodiment, the attribute classes comprise baseline indicators (B), evaluation indicators (E), intervention methods/groups (G), and time (T).

In this embodiment, the classified baseline indicators (B), evaluation indicators (E), intervention methods/groups (G), and time (T) are numbered. For example, the numbers are B1, B2 . . . ; E1, E2 . . . ; G1, G2 . . . ; T1, T2 . . . .

In this embodiment, the recorded experimental data is classified into baseline indicator data, evaluation indicator data, intervention method/data, and time data, and the classified experimental data is stratified according to predetermined stratifying standards, and numbers of data in each stratum are specified.

Specifically, according to predetermined stratifying standards, the baseline indicator data, the evaluation indicator data, the intervention method/group data, and the time data are stratified respectively, to form baseline indicator stratified data, evaluation indicator stratified data, intervention method/group stratified data, and time data.

For example, based on the intervention methods/groups (G), the evaluation indicators (E) and the baseline indicators (B) are split into preprocessed experimental arrays respectively, that is, arrays of EG-form codes and arrays of BG-form codes, which are numbered E11G1, E11G2 . . . ; and B11G1, B11G2 . . . , respectively.

The processing module 72 coupled to the recording module 71 is configured to select one element from each of two selected preprocessed experimental arrays according to an analysis requirement, and combine the elements to establish a cyclic experimental database; and perform cyclic statistical analysis on combination data in the cyclic experimental database by using a predetermined statistical analysis method, to obtain a cyclic statistical result corresponding to retrieved combination data. The cyclic experimental database comprises a plurality of combination data meeting the analysis requirement. The selected elements are homogeneous, that is, the selected elements are comparable to each other. Combination data in the cyclic experimental database includes group, baseline, stratum, time, and endpoint information. The processing module 52 is specifically configured to select one element from each of the two selected preprocessed experimental arrays according to the analysis requirement, and perform complete permutation and combination sequentially to form a complete permutation and combination database. The selected elements is comparable to each other, and combination data in the complete permutation and combination database includes group, baseline, stratum, time, and endpoint information; and retrieve, from the complete permutation and combination database, combination data meeting the analysis requirement, to establish the cyclic experimental database. The cyclic experimental database is a subset of the complete permutation and combination database.

The output module 73 coupled to the processing module 72 is configured to output the cyclic statistical result in a specified manner.

Specifically, the output module 73 output, in a form of a two-dimensional numerical matrix, the cyclic statistical result obtained after the cyclic statistical analysis; discretize matrix elements in the two-dimensional numerical matrix, and divide the matrix elements according to pre-divided statistical ranges; and assign different colors or different grayscale values to the divided statistical ranges, so that the cyclic statistical result is output visually.

Embodiment 3

This embodiment provides a device. The device comprises: a processor, a memory, a transceiver, a communications interface, and a system bus. The memory and the communications interface are connected to and mutually communicate with the processor and the transceiver through the system bus. The memory is configured to store a computer program. The communications interface is configured to communicate with other devices. The processor and the transceiver are configured to run the computer program, so that the device performs the steps of the management method for experimental data in Embodiment 1.

The aforementioned system bus may be a Peripheral Component Interconnect (PCI) bus, an Extended Industry Standard Architecture (EISA) bus, or the like. The system bus may be divided into an address bus, a data bus, a control bus, and the like. The communications interface is configured to implement communication between a database access apparatus and other devices (such as a client, a read/write library, and a read-only library). The memory may comprise a random access memory (RAM), and may also comprise a non-volatile memory, for example, at least one magnetic disk memory.

The foregoing processor may be a general-purpose processor, comprising a central processing unit (CPU), a network processor (NP), a digital signal processor (DSP), an application specific integrated circuit (ASIC), a field programmable gate array (FPGA) or other programmable logic devices, a discrete gate or a transistor logic device, or a discrete hardware component.

In conclusion, the method/system for managing experimental data, the readable storage medium, and the device provided in the present disclosure facilitate organization and management of clinical experimental data, and a statistical analysis strategy based on a complete permutation and combination mode for data units can change a single-combination analysis method for clinical experimental data, thereby implementing global analysis for medical data. A statistical program design corresponding to the complete permutation and combination analysis strategy can change a pair-wise data unit operation mode of existing interactive statistical software, and implement identical statistical analysis steps in batches. A result is output visually. Global analysis can be performed. The present disclosure is more convenient to use, and avoids the one-sidedness and blindness of conventional statistical strategies and methods. Therefore, the present disclosure effectively overcomes various disadvantages and achieves high industrial application value.

The foregoing embodiments are only used to illustrate the principle and efficacy of the present disclosure exemplarily, and are not intended to limit the present disclosure. Any person skilled in the art can make modifications or variations on the foregoing embodiments without departing from the spirit and scope of the present disclosure. Accordingly, all equivalent modifications or variations completed by those with common knowledge in the art without departing from the spirit and technical thinking disclosed by the present disclosure should fall within the scope of the claims of the present disclosure.

What is claimed is:

1. A method for managing experimental data, comprising:
    recording the experimental data, and preprocessing the experimental data, to obtain at least two preprocessed experimental arrays;
    selecting one element from each of two selected preprocessed experimental arrays according to an analysis requirement, and combining the elements to establish a cyclic experimental database, wherein the cyclic experimental database comprises a plurality of combination data meeting the analysis requirement;
    performing cyclic statistical analysis on the combination data in the cyclic experimental database, to obtain a cyclic statistical result corresponding to retrieved combination data; and
    outputting the cyclic statistical result in a specified manner, comprising:
        outputting, in a form of a two-dimensional numerical matrix, the cyclic statistical result obtained after the cyclic statistical analysis;
        discretizing matrix elements in the two-dimensional numerical matrix, and dividing the matrix elements according to pre-divided statistical ranges; and
        assigning different colors or different grayscale values to the divided statistical ranges, so that the cyclic statistical result is output visually;
    wherein recording the experimental data and preprocessing the experimental data comprises:
        classifying the recorded experimental data according to attribute classes of the experimental data, the attribute classes comprise baseline indicators, evaluation indicators, intervention methods or groups, and time;
        stratifying the classified experimental data respectively; and
        grouping stratified experimental data of other classes based on one of the attribute classes, to obtain at least two preprocessed experimental arrays.

2. The method for managing experimental data as in claim 1, wherein
    classifying the recorded experimental data according to attribute classes of the experimental data comprises
    classifying the recorded experimental data into baseline indicator data, evaluation indicator data, intervention method or data, and time data; and
    stratifying the classified experimental data respectively comprises stratifying the baseline indicator data, the evaluation indicator data, the intervention method or group data, and the time data according to predetermined stratifying standards of the baseline indicator data, the evaluation indicator data, the intervention method or group data, and the time data respectively, to form baseline indicator stratified data, evaluation indicator stratified data, intervention method or group stratified data, and time data.

3. The method for managing experimental data as in claim 1, wherein
    selecting one element from each of two selected preprocessed experimental arrays according to an analysis requirement, and combining the elements to establish a cyclic experimental database comprises:
    selecting one element from each of the two selected preprocessed experimental arrays, and performing complete permutation and combination sequentially to form a complete permutation and combination database, wherein the selected elements are comparable to each other, and combination data in the complete permutation and combination database comprises group, baseline, stratum, time, and endpoint information; and
    retrieving, from the complete permutation and combination database, combination data meeting the analysis requirement, to establish the cyclic experimental database, the cyclic experimental database is a subset of the complete permutation and combination database.

4. A system for managing experimental data, comprising:
    a recording module, configured to record the experimental data, and preprocess the experimental data, to obtain at least two preprocessed experimental arrays; and
    a processing module, configured to select one element from each of two selected preprocessed experimental arrays according to an analysis requirement, and combine the elements to establish a cyclic experimental database, the cyclic experimental database comprises a plurality of combination data; and perform cyclic statistical analysis on the combination data in the cyclic experimental database, to obtain a cyclic statistical result corresponding to retrieved combination data, wherein the processing module is a central processing unit; and
    an output module, configured to
        output, in a form of a two-dimensional numerical matrix, the cyclic statistical result obtained after the cyclic statistical analysis;
        discretize matrix elements in the two-dimensional numerical matrix, and dividing the matrix elements according to pre-divided statistical ranges; and
        assign different colors or different grayscale values to the divided statistical ranges, so that the cyclic statistical result is output visually;
    wherein a process of recording the experimental data and preprocessing the experimental data comprises:
        classifying the recorded experimental data according to attribute classes of the experimental data, the attribute classes comprises baseline indicators, evaluation indicators, intervention methods or groups, and time;
        stratifying the classified experimental data respectively; and grouping stratified experimental data of other classes based on one of the attribute classes, to obtain at least two preprocessed experimental arrays.

5. A non-transitory computer readable storage medium, storing a computer program, wherein when the program is executed by a processor, a method for managing experimental data is implemented, the method comprises:
- recording the experimental data, and preprocessing the experimental data, to obtain at least two preprocessed experimental arrays; wherein recording the experimental data and preprocessing the experimental data comprises:
  - classifying the recorded experimental data according to attribute classes of the experimental data, the attribute classes comprises baseline indicators, evaluation indicators, intervention methods or groups, and time;
  - stratifying the classified experimental data respectively; and
  - grouping stratified experimental data of other classes based on one of the attribute classes, to obtain at least two preprocessed experimental arrays;
- selecting one element from each of two selected preprocessed experimental arrays according to an analysis requirement, and combining the elements to establish a cyclic experimental database, wherein the cyclic experimental database comprises a plurality of combination data meeting the analysis requirement;
- performing cyclic statistical analysis on the combination data in the cyclic experimental database, to obtain a cyclic statistical result corresponding to retrieved combination data; and
- outputting the cyclic statistical result in a specified manner, comprising:
  - outputting, in a form of a two-dimensional numerical matrix, the cyclic statistical result obtained after the cyclic statistical analysis;
  - discretizing matrix elements the two-dimensional numerical matrix, and dividing the matrix elements according to pre-divided statistical ranges; and
  - assigning different colors or different grayscale values to the divided statistical ranges, so that the cyclic statistical result is output visually.

\* \* \* \* \*